(12) United States Patent
Hollingworth

(10) Patent No.: US 9,317,103 B2
(45) Date of Patent: Apr. 19, 2016

(54) METHOD AND SYSTEM FOR SELECTIVE POWER CONTROL FOR A MULTI-MEDIA PROCESSOR

(71) Applicant: Broadcom Corporation, Irvince, CA (US)

(72) Inventor: Gordon Hollingworth, Ely (GB)

(73) Assignee: Broadcom Corporation, Irvine, CA (US)

( * ) Notice: Subject to any disclaimer, the term of this patent is extended or adjusted under 35 U.S.C. 154(b) by 366 days.

(21) Appl. No.: 13/873,742

(22) Filed: Apr. 30, 2013

(65) Prior Publication Data

US 2013/0246826 A1 Sep. 19, 2013

Related U.S. Application Data

(63) Continuation of application No. 12/907,213, filed on Oct. 19, 2010, now Pat. No. 8,452,997.

(60) Provisional application No. 61/326,973, filed on Apr. 22, 2010.

(51) Int. Cl.
  *G06F 1/00* (2006.01)
  *G06F 1/32* (2006.01)

(52) U.S. Cl.
  CPC ............ *G06F 1/3287* (2013.01); *G06F 1/3203* (2013.01); *G06F 1/3275* (2013.01); *Y02B 60/1228* (2013.01); *Y02B 60/1282* (2013.01)

(58) Field of Classification Search
  USPC .................................................. 713/300–340
  See application file for complete search history.

(56) References Cited

U.S. PATENT DOCUMENTS

| | | | |
|---|---|---|---|
| 5,615,376 A | 3/1997 | Ranganathan | |
| 6,314,523 B1 * | 11/2001 | Voltz | 713/324 |
| 6,782,486 B1 | 8/2004 | Miranda et al. | |
| 7,426,647 B2 * | 9/2008 | Fleck et al. | 713/320 |
| 7,437,582 B1 | 10/2008 | Parlour | |
| 7,778,838 B2 * | 8/2010 | Sebestian et al. | 704/500 |
| 8,041,848 B2 * | 10/2011 | Conroy et al. | 710/22 |
| 8,452,997 B2 * | 5/2013 | Hollingworth | 713/320 |
| 8,682,460 B2 * | 3/2014 | Lindahl | 700/94 |
| 2006/0206729 A1 | 9/2006 | Hentschel et al. | |
| 2007/0079161 A1 | 4/2007 | Gupta | |
| 2008/0307240 A1 * | 12/2008 | Dahan et al. | 713/320 |
| 2009/0172431 A1 | 7/2009 | Gupta et al. | |
| 2009/0204835 A1 | 8/2009 | Smith et al. | |
| 2009/0204837 A1 | 8/2009 | Raval et al. | |
| 2010/0064154 A1 | 3/2010 | King | |
| 2010/0235660 A1 | 9/2010 | Sutardja et al. | |
| 2011/0148890 A1 | 6/2011 | Kaburlasos et al. | |
| 2011/0246806 A1 | 10/2011 | Conroy et al. | |
| 2011/0276812 A1 | 11/2011 | Lee et al. | |
| 2012/0023345 A1 | 1/2012 | Naffziger et al. | |

* cited by examiner

*Primary Examiner* — Raymond Phan
(74) *Attorney, Agent, or Firm* — Brinks Gilson & Lione

(57) ABSTRACT

A method and system for controlling power is provided. The system is configured to selectively control a plurality of power control domains. The system may be configured to process audio data in at least one of the domains. The system may be configured to output audio data, while one or more of the power control domains is suspended.

20 Claims, 6 Drawing Sheets

METHOD AND SYSTEM FOR SELECTIVE POWER CONTROL FOR A MULTI-MEDIA PROCESSOR

CROSS REFERENCE TO RELATED APPLICATIONS

This application is a continuation of U.S. patent application Ser. No. 12/907,213, filed Oct. 19, 2010, which is a non-provisional application of U.S. Provisional Patent Application Ser. No. 61/326,973, which was filed Apr. 22, 2010, all of which are incorporated by reference herein in its entirety and to which priority is claimed.

This application also makes reference to:

U.S. patent application Ser. No. 12/795,170, which was filed on Jun. 7, 2010;
U.S. patent application Ser. No. 12/686,800, which was filed on Jan. 13, 2010;
U.S. Provisional Application Ser. No. 61/311,640, which was filed on Mar. 8, 2010;
U.S. patent application Ser. No. 12/868,192, which was filed on Aug. 25, 2010;
U.S. Provisional Application Ser. No. 61/328,541, which was filed on Apr. 27, 2010;
U.S. Provisional Application Ser. No. 61/320,179, which was filed on Apr. 1, 2010;
U.S. Provisional Application Ser. No. 61/312,988, which was filed on Mar. 11, 2010;
U.S. Provisional Application Ser. No. 61/323,078, which was filed on Apr. 12, 2010;
U.S. Provisional Application Ser. No. 61/321,244, which was filed on Apr. 6, 2010;
U.S. patent application Ser. No. 12/869,900, which was filed on Aug. 27, 2010; and
U.S. patent application Ser. No. 12/835,522, which was filed on Jul. 13, 2010.

Each of the above stated applications is hereby incorporated herein by reference in its entirety.

TECHNICAL FIELD

Certain embodiments of the invention relate to power management in communication systems. More specifically, certain embodiments of the invention relate to a method and system for suspending power domains while providing an audio output.

BACKGROUND

Image and video capabilities may be incorporated into a wide range of devices such as, for example, cellular phones, personal digital assistants, digital televisions, digital direct broadcast systems, digital recording devices, gaming consoles and the like. Operating on video data, however, may be very computationally intensive because of the large amounts of data that need to be constantly moved around. This normally requires systems with powerful processors, hardware accelerators, and/or substantial memory, particularly when video encoding is required. Such systems may typically use large amounts of power, which may make them less than suitable for certain applications, such as mobile applications.

Due to the ever growing demand for image and video capabilities, there is a need for power-efficient, high-performance multimedia processors that may be used in a wide range of applications, including mobile applications. Such multimedia processors may support multiple operations including audio processing, image sensor processing, video recording, media playback, graphics, three-dimensional (3D) gaming, and/or other similar operations. Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for suspending power control domains is provided, as set forth more completely in the claims.

DETAILED DESCRIPTION

Certain embodiments of the invention can be found in a method and system for suspending a video processor and saving the processor state in a synchronous dynamic access memory (SDRAM), utilizing a core processor. Various embodiments of the invention provide power management in an integrated circuit in which a multimedia processor may comprise a plurality of power domains. In this regard, the multimedia processor may comprise a first portion associated with a first power domain and a second portion associated with a second power domain. Both portions of the multimedia processor are integrated in a single substrate of the integrated circuit. Data may be transferred from the first portion of the multimedia processor to the second portion of the multimedia processor. The transferred data may comprise audio data, for example. Upon completion of the data transfer to the second portion of the multimedia processor, the first portion of the multimedia processor may be powered down. The data in the second portion of the multimedia processor may then be transferred to a device that is external to the multimedia processor. When a trigger event associated with the transfer of the data to the external device occurs, the previously powered-down first portion of the multimedia processor may be powered up. Once powered up, the first portion of the multimedia processor may transfer additional data to the second portion of the multimedia processor, which may subsequently be transferred to the external device.

In an embodiment of the invention, when the trigger event occurs, one or more signals may be generated in the second portion of the multimedia processor to power up the first portion of the multimedia processor. The trigger event may be associated with an amount of the data that remains to be transferred to the external device, for example. In this regard, one or more signals may be generated in the second portion of the multimedia processor to power up the first portion of the multimedia processor when the amount of data that remains to be transferred to the external device is below a threshold value.

When the first portion of the multimedia processor is powered down, state information associated with the first portion of the multimedia device may be stored. The state information may be stored in a memory such as a synchronous dynamic random access memory (SDRAM), for example. The memory in which the state information is stored may be external to the multimedia processor. When the first portion of the multimedia processor is powered up in response to the occurrence of a triggering event, the stored state information may be received by the multimedia processor and may be used to reboot the first portion of the multimedia processor. Additional data may then be transferred from the first portion of the multimedia processor to the second portion of the multimedia processor and subsequently to the external device.

Figure 1A:
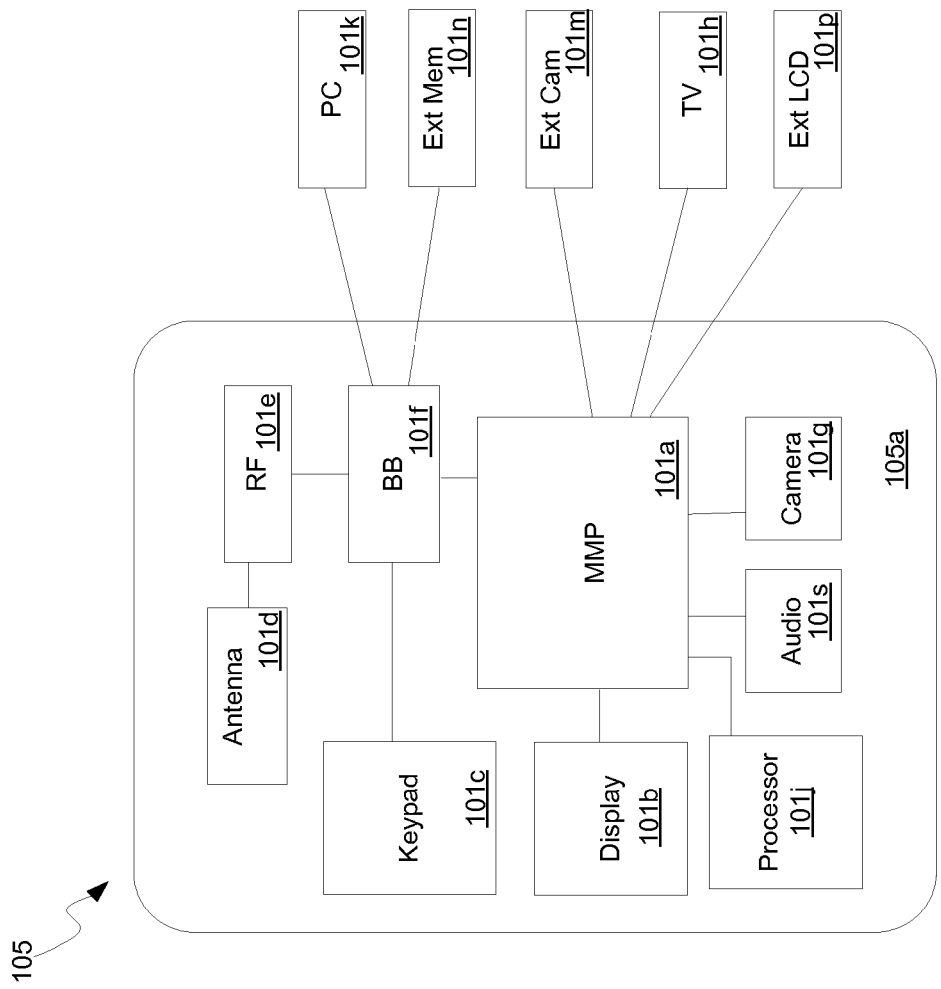
FIG. 1A is a block diagram of an exemplary multimedia system, in accordance with an embodiment of the invention.

FIG. 1A is a block diagram of an exemplary multimedia system, in accordance with an embodiment of the invention. Referring to FIG. 1A, there is shown a mobile multimedia system 105 that comprises a mobile multimedia device 105a, a television (TV) 101h, a personal computer (PC) 101k, an external camera 101m, external memory 101n, and external liquid crystal display (LCD) 101p. The mobile multimedia device 105a may be a cellular telephone or other handheld communication device. The mobile multimedia device 105a may comprise a mobile multimedia processor (MMP) 101a, an antenna 101d, an audio block 101s, a radio frequency (RF) block 101e, a baseband processing block 101f, a display 101b, a keypad 101c, and a camera 101g. The display 101b may comprise an LCD and/or a light-emitting diode (LED).

The MMP 101a may comprise suitable circuitry, logic, interfaces, and/or code that may be operable to perform video and/or multimedia processing for the mobile multimedia device 105a. The MMP 101a may also comprise integrated interfaces, which may be utilized to support one or more external devices coupled to the mobile multimedia device 105a. For example, the MMP 101a may support connections to a TV 101h, an external camera 101m, and an external LCD 101p.

The MMP 101a may be operable to perform power-efficient data processing operations. In this regard, the MMP 101a may be operable to implement one or more power management procedures in connection with data processing operations. For example, when the MMP 101a processes audio data streams, such as MPEG-1 audio layer 3 (MP3) data, for example, the MMP 101a may be operated at very low frequencies that enable the MMP 101a to reduce the amount of power consumed while allowing the audio data processing throughput to remain at an appropriate level. For example, at frequencies below 10 megahertz (MHz), and as low as 4 MHz, the MMP 101a may provide both low power operation and sufficient data processing throughput.

Low frequency operations, however, still require that certain busses be continuously clocked, which produces a corresponding power drain. Consequently, other approaches may also be implemented to improve power efficiency in the MMP 101a. For example, different portions of the MMP 101a may be associated with different power domains. Each power domain in the MMP 101a may operate and/or be controlled separately and/or independently from the other power domains. That is, the power provided to a particular portion of the MMP 101a may be regulated by the power domain associated with that portion of the MMP 101a. In this regard, the power provided to each device, module, and/or component in that portion of the MMP 101a may be controlled by regulating the power in the associated power domain.

During power-efficient data processing operations, a portion of the MMP 101a may be suspended when demand for that portion of the MMP 101a to be operated is below a certain level, value and/or threshold. When suspended, a substantial part or the entire portion of the MMP 101a that is being suspended may be powered down. State information associated with the portion of the MMP 101a that is being suspended may be stored or saved for later use. Powering down a portion of the MMP 101a may be achieved by removing or limiting power to the associated power domain. Such regulation of the power that is being provided to any one portion of the MMP 101a may be done by, for example, controlling core voltages and/or core frequencies utilizing software executed in the MMP 101a. When a suspended portion of the MMP 101a is again needed as part of a data processing operation, that portion may be woken up by powering up to its associated power domain. The state information that was previously saved may be retrieved and may be used to rapidly reboot the now powered-up portion of the MMP 101a. Such power-efficient data processing operations may be utilized when the MMP 101a processes video data, audio data, or both.

The processor 101j may comprise suitable circuitry, logic, interfaces, and/or code that may be operable to control processes in the mobile multimedia system 105. Although not shown in FIG. 1A, the processor 101j may be coupled to a plurality of devices in and/or coupled to the mobile multimedia system 105.

In operation, the mobile multimedia device may receive signals via the antenna 101d. Received signals may be processed by the RF block 101e and the RF signals may be converted to baseband by the baseband processing block 101f. Baseband signals may then be processed by the MMP 101a. Audio and/or video data may be received from the external camera 101m, and image data may be received via the integrated camera 101g. During processing, the MMP 101a may utilize the external memory 101n for storing of processed data. Processed audio data may be communicated to the audio block 101s and processed video data may be communicated to the display 101b and/or the external LCD 101p, for example. The keypad 101c may be utilized for communicating processing commands and/or other data, which may be required for audio or video data processing by the MMP 101a.

In an embodiment of the invention, the MMP 101a may be operable to perform power-efficient data processing operations. Such operations may comprise, for example, suspending a portion of the MMP 101a by regulating the power that is being provided to the power domain in the MMP 101a that corresponds to that portion of the MMP 101a and saving the state information associated with that portion of the MMP 101a. When an event occurs during the data processing operation indicating that the previously powered-down portion of the MMP 101a is to be awaken, one or more signals may be generated to reestablish power to the powered-down portion of the MMP 101a. Moreover, the state information may be utilized to reboot the now powered-up portion of the MMP 101a.

Figure 1B:
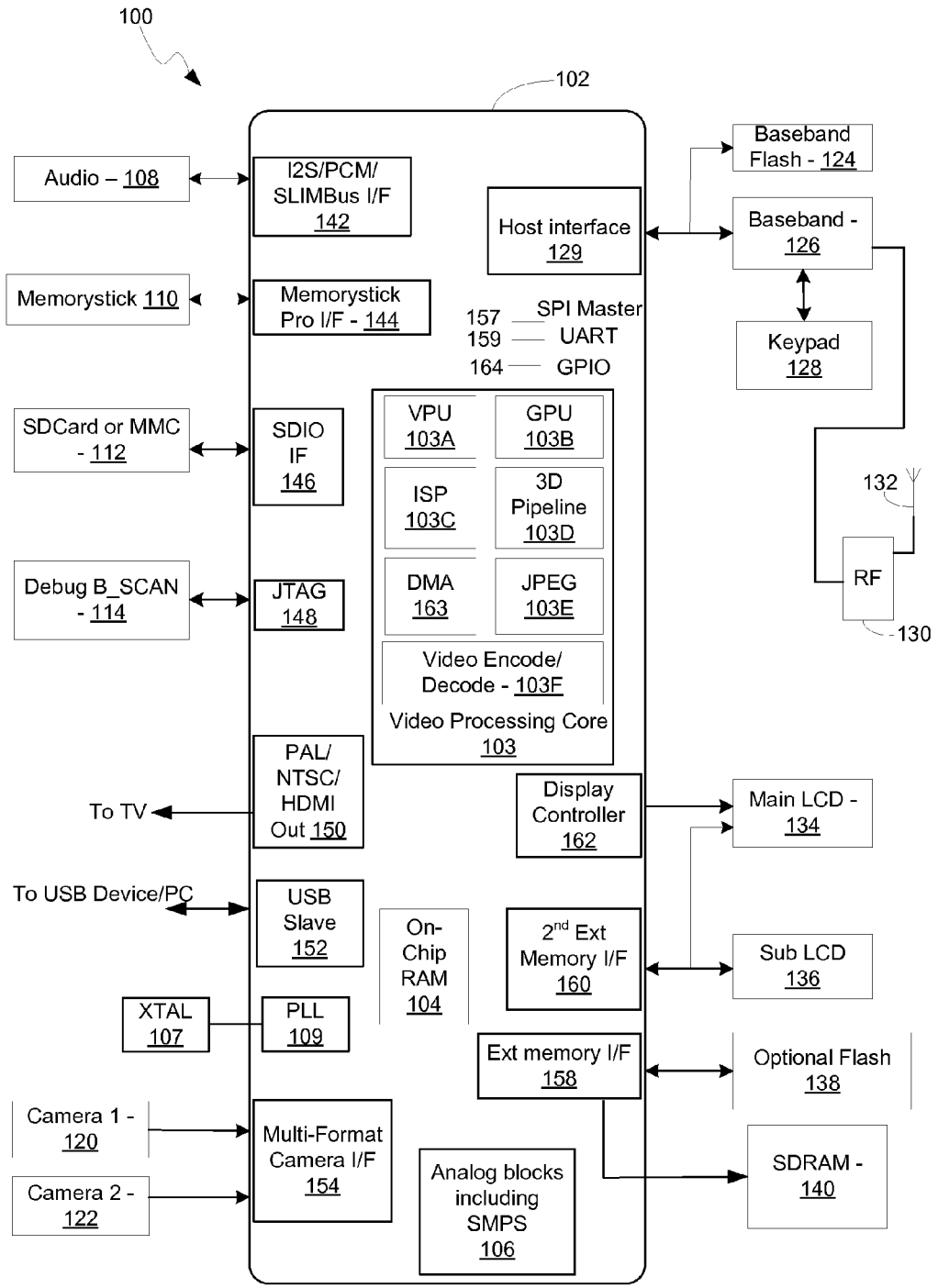
FIG. 1B is a block diagram of an exemplary multimedia processor that is operable to provide power management operations, in accordance with an embodiment of the invention.

FIG. 1B is a block diagram of an exemplary multimedia processor that is operable to provide power management operations, in accordance with an embodiment of the invention. Referring to FIG. 1B, the mobile multimedia processor 102 may comprise suitable logic, circuitry, interfaces, and/or code that may be operable to perform video and/or multimedia processing for handheld multimedia products. For example, the mobile multimedia processor 102 may be designed and optimized for video record/playback, mobile TV and 3D mobile gaming, utilizing integrated peripherals and a video processing core. The mobile multimedia processor 102 may comprise a video processing core 103 that may comprise a vector processing unit (VPU) 103A, a graphic processing unit (GPU) 103B, an image sensor pipeline (ISP) 103C, a 3D pipeline 103D, a direct memory access (DMA) controller 163, a Joint Photographic Experts Group (JPEG) encoding/decoding module 103E, and a video encoding/decoding module 103F. The mobile multimedia processor 102 may also comprise on-chip RAM 104, an analog block 106, a phase-locked loop (PLL) 109, an audio interface (I/F) 142, a memory stick I/F 144, a Secure Digital input/output (SDIO) I/F 146, a Joint Test Action Group (JTAG) I/F 148, a TV output I/F 150, a Universal Serial Bus (USB) I/F 152, a camera I/F 154, and a host I/F 129. The mobile multimedia processor 102 may further comprise a serial peripheral interface (SPI) 157, a universal asynchronous receiver/transmitter (UART) I/F 159, a general purpose input/output (GPIO) pins 164, a display controller 162, an external memory I/F 158, and a second external memory I/F 160.

Also shown in FIG. 1B are an audio block 108 that may be coupled to the audio interface I/F 142, a memory stick 110 that may be coupled to the memory stick I/F 144, an SD card block 112 that may be coupled to the SDIO IF 146, and a debug block 114 that may be coupled to the JTAG I/F 148. The PAL/NTSC/high definition multimedia interface (HDMI) TV output I/F 150 may be utilized for communication with a TV, and the USB 1.1, or other variant thereof, slave port I/F 152 may be utilized for communications with a PC, for example. A crystal oscillator (XTAL) 107 may be coupled to the PLL 109. Cameras 120 and/or 122 may be coupled to the camera I/F 154.

Moreover, FIG. 1B shows a baseband processing block 126 that may be coupled to the host interface 129, a radio frequency (RF) processing block 130 coupled to the baseband processing block 126 and an antenna 132, a basedband flash 124 that may be coupled to the host interface 129, and a keypad 128 coupled to the baseband processing block 126. A main LCD 134 may be coupled to the mobile multimedia processor 102 via the display controller 162 and/or via the second external memory interface 160, for example, and a subsidiary LCD 136 may also be coupled to the mobile multimedia processor 102 via the second external memory interface 160, for example. Moreover, an optional flash memory 138 and/or an SDRAM 140 may be coupled to the external memory I/F 158.

The video processing core 103 may comprise suitable logic, circuitry, interfaces, and/or code that may be operable to perform video processing of data. The on-chip Random Access Memory (RAM) 104 and the Synchronous Dynamic RAM (SDRAM) 140 comprise suitable logic, circuitry and/or code that may be adapted to store data such as image or video data. In some instances, the video processing of data comprises processing of audio data associated with a video sequence, for example.

Although not shown in FIG. 1B, the video processing core 103 may comprise a plurality of power domains that may be operated and/or controlled separately and/or independently from each other. Each power domain may be associated with a portion of the video processing core 103. That is, the power provided to a particular portion of the video processing core 103 may be regulated by the power domain associated with that portion of the video processing core 103. In this regard, the power provided to each device, module, and/or component in that portion of the video processing core 103 may be controlled by regulating the power in the associated power domain. An exemplary description of a video processing core with multiple power domains is provided below with respect to FIG. 2.

During power-efficient data processing operations in the mobile multimedia processor 102, a portion of the video processing core 103 may be suspended when demand for that portion of the video processing core 103 to be operated falls below a certain level, value, and/or threshold. When suspended, a substantial part or the entire portion of the video processing core 103 may be powered down. State information associated with the suspended portion of the video processing core 103 may be stored or saved for later use. In this regard, a memory internal to the mobile multimedia processor 102 or a memory external to the mobile multimedia processor 102, such as the SDRAM 140, for example, may be utilized to store the state information. Powering down a portion of the video processing core 103 may be achieved by removing or limiting power to the associated power domain. When a suspended portion of the video processing core 103 is again needed as part of a data processing operation, that portion may be woken up by providing power to its associated power domain. The state information that was previously saved may be retrieved from memory and may be used by the mobile multimedia processor 102 to rapidly reboot the now powered-up portion of the video processing core 103.

The VPU 103A may comprise suitable logic, circuitry, code, and/or interfaces that may be operable to perform video processing of data. In an embodiment of the invention, the VPU 103A may by suspended and/or woken up during data processing operations by regulating power to a power domain associated with the VPU 103A. For example, the VPU 103A may be utilized to decode a burst of encoded audio data such as MP3 data. The decoded audio data may be stored in, for example, the on-chip RAM 104 before being transferred to a device external to the mobile multimedia processor 102 through, for example, the audio interface 142. The VPU 103A may be powered down after the burst of encoded audio data is processed by regulating the power that is provided to the power domain in the video processing core 103 associated with the VPU 103A. Moreover, state information associated with the VPU 103 may be stored to reboot the VPU 103A once it is powered back up to decode additional audio data. The VPU 103 may be powered up by reestablishing power to the associated power domain.

The audio interface 142 may be operable to keep track of the decoded audio data that is being transferred out of the mobile multimedia processor 102 to the external device. For example, the audio interface I/F 142 may determine that the amount of decoded audio data that is available to be transferred to the external device is at or below a threshold value by comparing the two. When the amount of decoded audio data is below the threshold value, the audio interface 142 may generate one or more signals that may be utilized to wake up the VPU 103A such that additional decoded audio data may be processed. Other devices, modules, and/or components in the mobile multimedia processor 102 may also be utilized to determine whether the VPU 103A is to be woken up and/or to generate the appropriate signal or signals to wake up the VPU 103A.

In operation, the mobile multimedia processor 102 may perform power-efficient multimedia processing operations.

More particularly, the VPU 103A in the mobile multimedia processor 102 may perform power-efficient video and/or audio data processing operations. In this regard, the VPU 103A may be suspended after decoding encoded audio data and may be woken up when additional decoded audio data is needed. The VPU 103A may be powered down by regulating the power that is provided to the power domain in the video processing core 103 associated with the VPU 103A. State information related to the various devices, modules, and/or components in the video processing core 103, including the VPU 103A, may be stored or saved in, for example, the SDRAM 140. When additional decoded audio data is needed, one or more signals may be generated by the audio interface 142 that may be utilized to wake up the VPU 103A. In this regard, power may be reestablished to the power domain in the video processing core 103 that is associated with the VPU 103A and the stored state information may be retrieved to reboot the VPU 103A.

Figure 2:
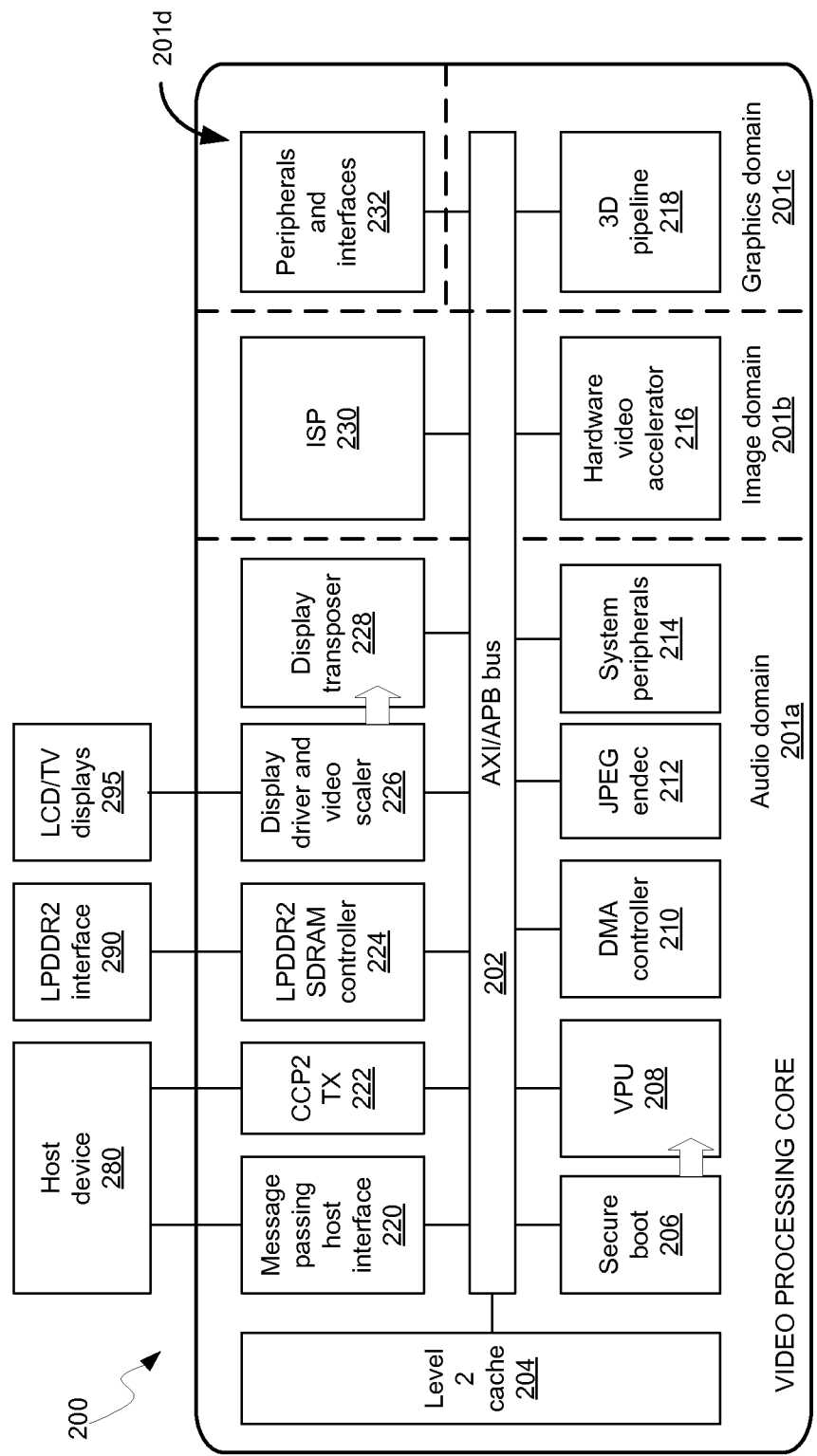
FIG. 2 is a block diagram of an exemplary video processing core architecture having a plurality of power domains and that is operable to provide power management operations, in accordance with an embodiment of the invention.

FIG. 2 is a block diagram of an exemplary video processing core architecture having a plurality of power domains and operable to provide power management operations, in accordance with an embodiment of the invention. Referring to FIG. 2, there is shown a video processing core 200 comprising suitable logic, circuitry, interfaces and/or code that may be operable for high performance video and multimedia processing. The architecture of the video processing core 200 may provide a flexible, low power, and high performance multimedia solution for a wide range of applications, including mobile applications, for example. By using dedicated hardware pipelines in the architecture of the video processing core 200, such low power consumption and high performance goals may be achieved. The video processing core 200 may correspond to, for example, the video processing core 103 described above with respect to FIG. 1B.

In an embodiment, the video processing core 200 may comprise an Advanced eXtensible Interface/Advanced Peripheral (AXI/APB) bus 202, a level 2 cache 204, a secure boot 206, a Vector Processing Unit (VPU) 208, a DMA controller 210, a JPEG encoder/decoder (endec) 212, a systems peripherals 214, a message passing host interface 220, a Compact Camera Port 2 (CCP2) transmitter (TX) 222, a Low-Power Double-Data-Rate 2 SDRAM (LPDDR2 SDRAM) controller 224, a display driver and video scaler 226, and a display transposer 228. The video processing core 200 may also comprise an ISP 230, a hardware video accelerator 216, a 3D pipeline 218, and peripherals and interfaces 232. In other embodiments of the video processing core 200, however, fewer or more components than those described above may be included.

In an embodiment, the VPU 208, the ISP 230, the 3D pipeline 218, the JPEG endec 212, the DMA controller 210, and/or the hardware video accelerator 216, may correspond to the VPU 103A, the ISP 103C, the 3D pipeline 103D, the JPEG 103E, the DMA 163, and/or the video encode/decode 103F, respectively, described above with respect to FIG. 1B.

Operably coupled to the video processing core 200 may be a host device 280, an LPDDR2 interface 290, and/or LCD/TV displays 295. The host device 280 may comprise a processor, such as a microprocessor or Central Processing Unit (CPU), microcontroller, Digital Signal Processor (DSP), or other like processor, for example. In some embodiments, the host device 280 may correspond to the processor 101j described above with respect to FIG. 1A. The LPDDR2 interface 290 may comprise suitable logic, circuitry, and/or code that may be operable to allow communication between the LPDDR2 SDRAM controller 224 and memory. The LCD/TV displays 295 may comprise one or more displays (e.g., panels, monitors, screens, cathode-ray tubes (CRTs)) for displaying image and/or video information. In some embodiments, the LCD/TV displays 295 may correspond to one or more of the TV 101h and the external LCD 101p described above with respect to FIG. 1A, and the main LCD 134 and the sub LCD 136 described above with respect to FIG. 1B.

The VPU 208 may comprise suitable logic, circuitry, and/or code that may be operable for data processing while maintaining high throughput and low power consumption. The VPU 208 may allow flexibility in the video processing core 200 such that software routines, for example, may be inserted into the processing pipeline. The VPU 208 may comprise a plurality of scalar cores and a vector core, for example. Each of the scalar cores may use a Reduced Instruction Set Computer (RISC)-style scalar instruction set and the vector core may use a vector instruction set, for example. Scalar and vector instructions may be executed in parallel. Although not shown in FIG. 2, the VPU 208 may comprise one or more Arithmetic Logic Units (ALUs), a scalar data bus, a scalar register file, one or more Pixel-Processing Units (PPUs) for vector operations, a vector data bus, a vector register file, a Scalar Result Unit (SRU) that may operate on one or more PPU outputs to generate a value that may be provided to a scalar core. Moreover, the VPU 208 may comprise its own independent level 1 instruction and data cache.

The LPDDR2 SDRAM controller 224 and the DMA controller 210 may comprise suitable logic, circuitry, and/or code that may be operable to control the access of memory by one or more components and/or processing blocks in the video processing core 200. The ISP 230 may comprise suitable logic, circuitry, and/or code that may be operable to provide hardware accelerated processing of data received from an image sensor (e.g., charge-coupled device (CCD) sensor, complimentary metal-oxide semiconductor (CMOS) sensor). The hardware video accelerator 216 may comprise suitable logic, circuitry, and/or code that may be operable for hardware accelerated processing of video data in any one of multiple video formats such as H.264, Windows Media 8/9/10 (VC-1), MPEG-1, MPEG-2, and MPEG-4, for example. The 3D pipeline 218 may comprise suitable logic, circuitry, and/or code that may be operable to provide 3D rendering operations for use in, for example, graphics applications. The JPEG endec 212 may comprise suitable logic, circuitry, and/or code that may be operable to provide processing (e.g., encoding, decoding) of images. The encoding and decoding operations need not operate at the same rate.

The display driver and video scaler 226 may comprise suitable logic, circuitry, and/or code that may be operable to drive the TV and/or LCD displays in the TV/LCD displays 295. The display transposer 228 may comprise suitable logic, circuitry, and/or code that may be operable for transposing output frames from the display driver and video scaler 226. The secure boot 206 may comprise suitable logic, circuitry, and/or code that may be operable to provide security and Digital Rights Management (DRM) support. The system peripherals 214 may comprise suitable logic, circuitry, and/or code that may be operable to support applications such as, for example, audio, image, and/or video applications.

Also shown in FIG. 2 is a plurality of power domains associated with the video processing core 200. By having more than one power domain, portions of the video processing core 200 may be powered down during certain operations. The plurality of power domains may comprise an audio domain 201a, an image domain 201b, a graphics domain 201c, and a domain 201d associated with the peripherals and interfaces 232. Each power domain may be associated with a particular portion of the video processing core 200. Moreover, each power domain may operate and/or be controlled separately and/or independently from the other power domains. For example, the image domain 201b may be utilized to regulate power to the ISP 230 and the hardware video accelerator 216. Power to the VPU 208, however, may be controlled through the audio domain 201a. Power may be regulated or controlled by adjusting the core voltage and/or the clock frequencies in software according to performance demands, for example. The host device 280 may be utilized to control the various power domains in the video processing core 200.

When a particular portion of the video processing core 200 is placed in a suspended mode, for example, the associated power domain may be powered down and information associated with the state of the suspended portion may be written to memory such as SDRAM, for example. In this mode, while there is no processing and the outputs are not driven, the input/output interfaces of the video processing core 200 may remain powered and the SDRAM may self refresh.

In operation, the VPU 208 of the video processing core 200 may be utilized to perform image processing operations in connection with various usage cases or scenarios. In one such exemplary case or scenario, the video processing core 200 may be utilized for movie playback applications in which the VPU 208 may perform discrete cosine transform (DCT) operations for MPEG-4 and/or 3D effects, for example. In another exemplary scenario, the video processing core 200 may be utilized for video capture and encoding applications in which the VPU 208 may perform DCT operations for MPEG-4 and/or additional software functions in the ISP 230 pipeline, for example. In another exemplary scenario, the video processing core 200 may be utilized for video game applications in which the VPU 208 may execute the gaming engine and/or may supply primitives to the 3D pipeline, for example.

In the exemplary usage cases or scenarios described above in which audio data processing is performed, the audio domain 201a associated with the VPU 208 may be powered down and/or powered up during such processing. In this regard, when the VPU 208 is utilized to decode encoded audio data, the audio domain 201a may be powered up until a sufficient or determined amount of audio data is decoded. Once the decoding of the audio data is complete, the audio domain 201a may be powered down and information associated with the state of the devices, modules, and/or components associated with the audio domain 201a, including the state information of the VPU 208, may be stored in memory. When additional decoded audio data is needed, the audio domain 201a may be powered up and the state information retrieved from memory to reboot the devices, modules, and/or components associated with the audio domain 201a, including the VPU 208.

Figure 3:
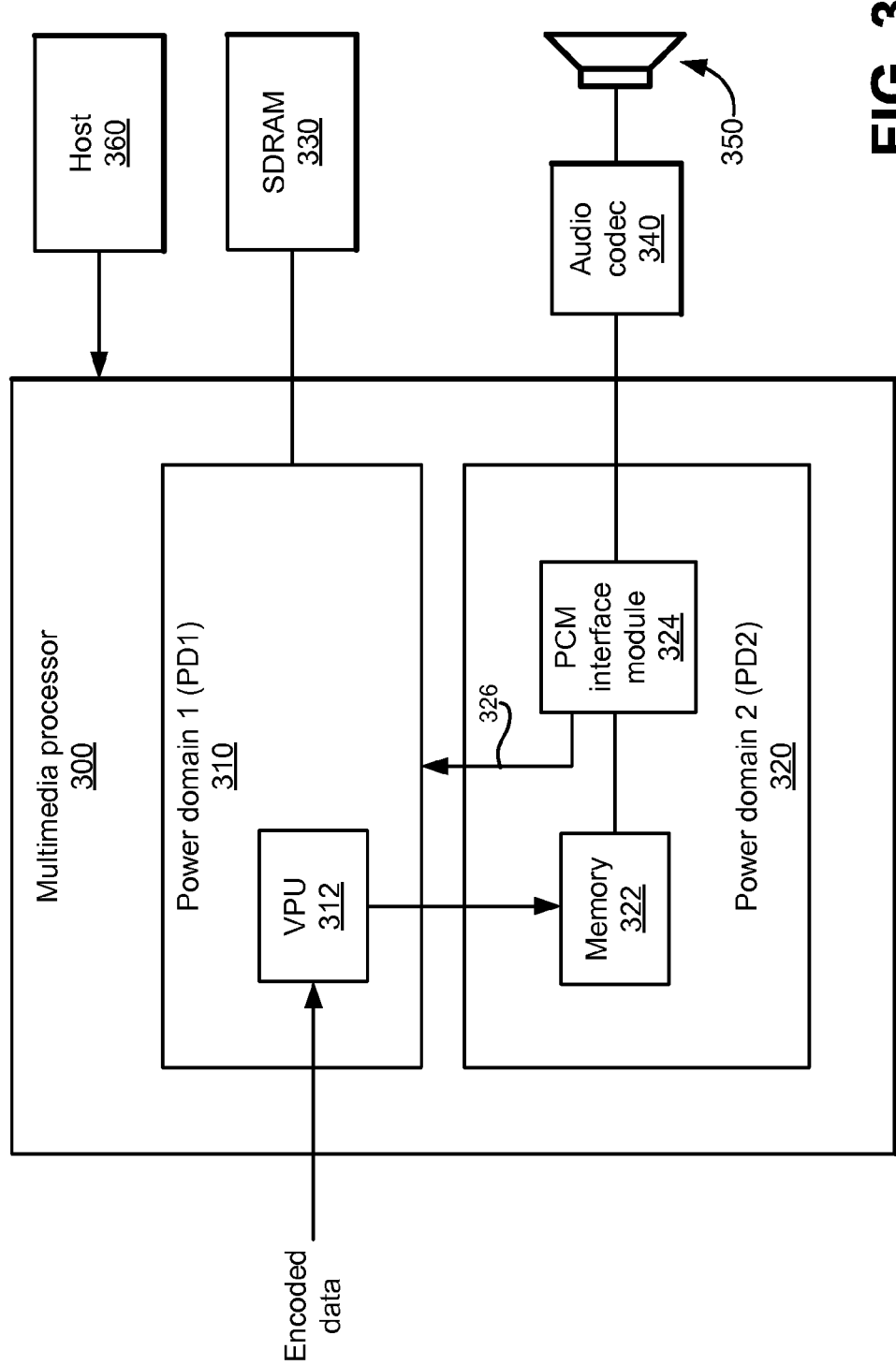
FIG. 3 is a block diagram of an exemplary multimedia processor having a plurality of power domains and operable to provide power management operations, in accordance with an embodiment of the invention.

FIG. 3 is a block diagram of an exemplary multimedia processor having a plurality of power domains and which is operable to provide power management operations, in accordance with an embodiment of the invention. Referring to FIG. 3, there is shown a multimedia processor 300 that may comprise a first power domain or power domain 1 (PD1) and a second power domain or power domain 2 (PD2). The PD1 and PD2 may be separate and/or independent from each other. The PD1 may be utilized to regulate or control power to a portion of the multimedia processor 300 that comprises a VPU 312 while the PD2 may be utilized to regulate or control power to a portion of the multimedia processor 300. The multimedia processor 300 comprises a memory 322 and a pulse-code modulation (PCM) interface module 324. Also shown in FIG. 3 are an SDRAM 330, an audio codec 340, a speaker 350, and a host 360.

The VPU 312 may be substantially similar to the VPU 103A or the VPU 208 described above, for example. The VPU 312 may be operable to decode encoded data, such as a stream of encoded audio data, for example. The VPU 312 may be suspended once an amount of audio data is decoded by powering down the PD1 and storing state information associated with the VPU 312 in the SDRAM 330. The VPU 312 may be woken up when additional decoded audio data is needed by powering up the PD1 and reading the state information in the SDRAM 330 to reboot the VPU 312.

The memory 322 may comprise suitable logic, circuitry, code, and/or interfaces that may be operable to store data received from the VPU 312. The PCM interface module 324 may comprise suitable logic, circuitry, code, and/or interfaces that may be operable to process data from the memory 322 and transfer the processed data to the audio codec 340. The audio codec 340 may in turn process the audio data received from the PCM interface module 324 and may transfer the data to the speaker 350.

The PCM interface module 324 may be operable to retrieve or read data from the memory 322 and keep track of the amount of retrieved data that is transferred to the audio codec 340. In this regard, the PCM interface module 324 may be operable to compare the amount of data retrieved from the memory 322 with a threshold value in order to determine whether the VPU 312 may need to decode additional audio data. In instances when the remaining amount of data retrieved from the memory 322 by the PCM interface module 324 is at or below the threshold value, the PCM interface module 324 may generate one or more signals 326 that may be utilized by the multimedia processor 300 to wake up the VPU 312 by reestablishing power to the PD1. In an embodiment of the invention, the one or more signals 326 may be utilized in connection with an interrupt controller and/or an interrupt controller register, for example. In an embodiment of the invention, the threshold value may be dynamically programmed by, for example, the host 330. The host 330 may also be utilized to regulate or control power to the PD1 and/or the PD2.

The SDRAM 330 may be utilized to store information associated with a state of the PD1 when the PD1 is powered down during a suspended mode in which there is no processing of data by the VPU 312. The state information may be retrieved by the multimedia processor 300 when the PD1 is powered back up as the suspended mode is terminated and the VPU 312 is again operated to process data.

Figure 4:
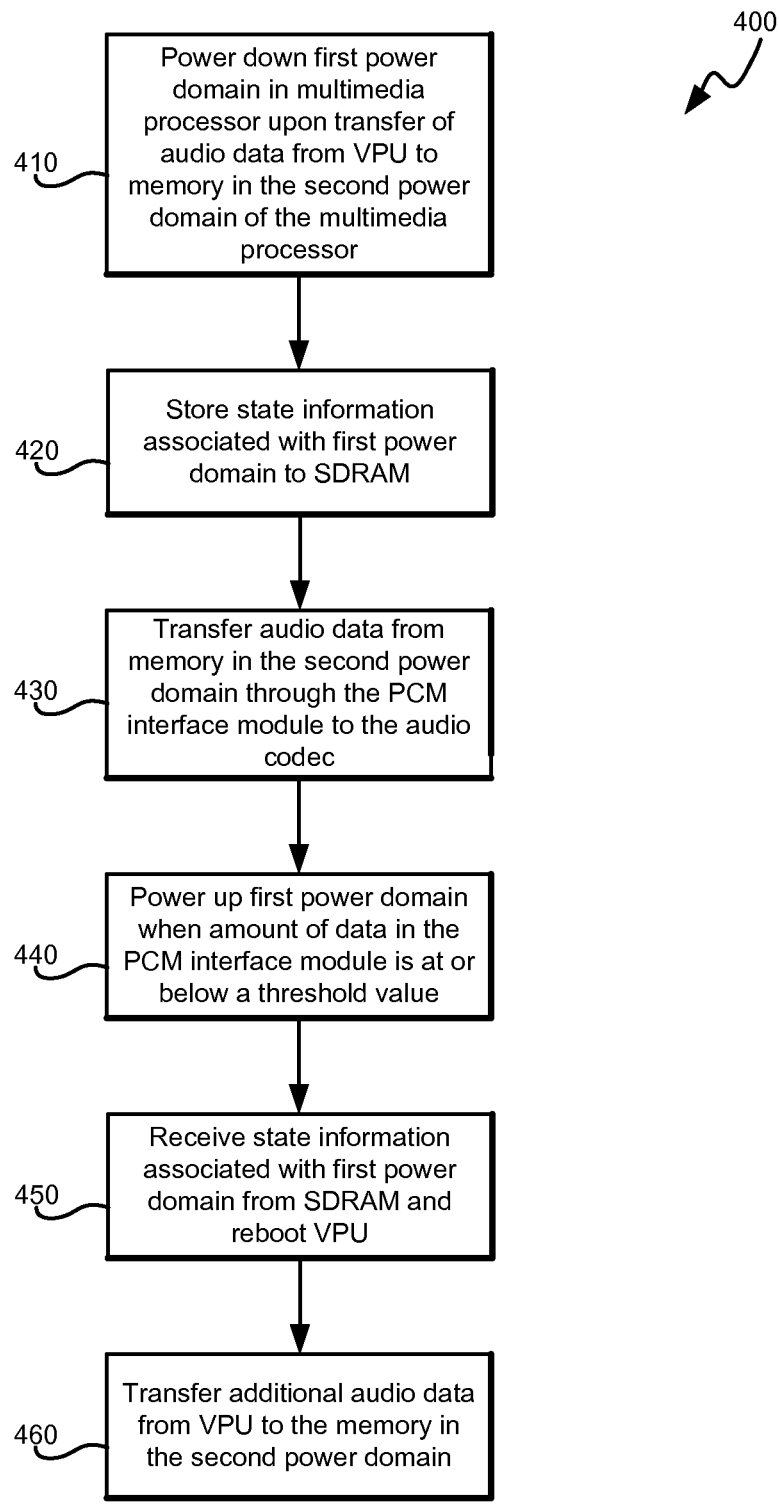
FIG. 4 is a flow chart that illustrates an exemplary operation of the multimedia processor in FIG. 3, in accordance with an embodiment of the invention.

FIG. 4 is a flow chart that illustrates an exemplary operation of the multimedia processor in FIG. 3, in accordance with an embodiment of the invention. Referring to FIG. 4, there is shown a flow chart 400 in which, at step 410, the PD1 shown in FIG. 3 is powered down upon completing the transfer of the audio data decoded by the VPU 312 to the memory 322. The audio data may be MP3 data, for example. Moreover, the audio data decoding performed by the VPU 312 may be carried out at a very high frequency to process a large amount of audio data in a short period of time. At step 420, state information of any devices, modules, and/or components in the portion of the multimedia processor 300 that is associated with the PD1, including the VPU 312, may be stored in the SDRAM 330. At step 430, the decoded audio data in the memory 322 may be read by the PCM interface module 324 such that the decoded audio data may be processed and transferred to the audio codec 340 and subsequently to the speaker 350.

At step 440, when the PCM interface module 324 determines that additional decoded audio data from the VPU 312 is needed, the PCM interface module 324 may generate one or more signals 326 to power up the PD1. At step 450, the one or more signals 326 may also be utilized by the multimedia processor 300 to read the state information stored in the SDRAM 330 and wake up any devices, modules, and/or components in the portion of the multimedia processor 300 that is associated with the PD1, including the VPU 312, through a quick reboot. At step 460, the VPU 312 may again process a stream of encoded audio data at a high frequency such that additional decoded audio data may be transferred to the memory 322.

Figure 5:
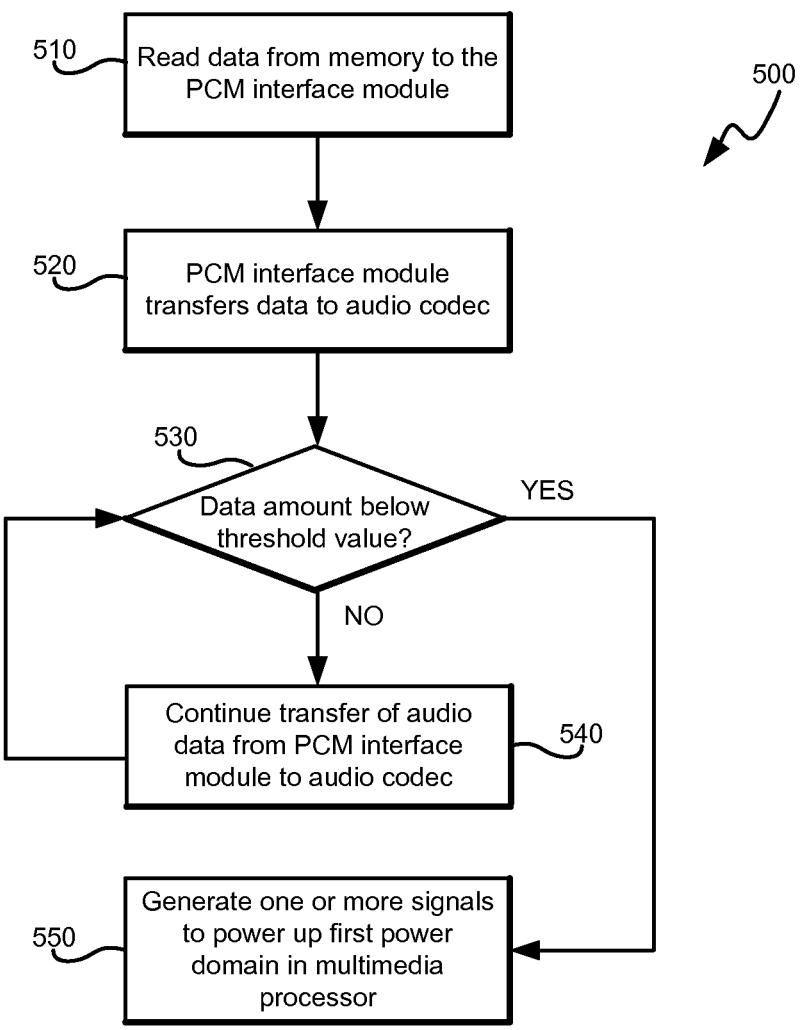
FIG. 5 is a flow chart that illustrates an exemplary operation of the pulse-code modulation (PCM) interface module in FIG. 3, in accordance with an embodiment of the invention.

FIG. 5 is a flow chart that illustrates an exemplary operation of the PCM interface module in FIG. 3, in accordance with an embodiment of the invention. Referring to FIG. 5, there is shown a flow graph 500 in which, at step 510, the PCM interface module 324 may read the decoded audio data stored in the memory 322. At step 520, the PCM interface module 324 may begin the transfer of the decoded audio data to the audio codec 340. At step 530, the PCM interface module 324 may determine whether the amount of decoded audio data read from the memory 322 is at or below a threshold value. When the amount of the decoded audio data is above the threshold value, the process may proceed to step 540 in which additional decoded audio data is transferred to the audio codec 340 before returning to step 530. When the amount of the decoded audio data is at or below the threshold value in the PCM interface module 324, the process may proceed to step 550 in which the PCM interface module 324 may generate one or more signals 326 to power up the PD1 and wake up the VPU 312.

Referring back to FIG. 1B, in an embodiment of the invention, power management in an integrated circuit may comprise transferring data from a first portion of a multimedia processor, such as a portion of the video processing core 103 in the mobile multimedia processor 102 that comprises the VPU 103A, to a second portion of the multimedia processor, such as a portion of the mobile multimedia processor 102 that comprises the on-chip RAM 104 and/or the audio interface 142. For example, data may be transferred from the VPU 103A in the video processing core 103 to the on-chip RAM 104. The first portion of the mobile multimedia processor 102 is associated with a first power domain and the second portion of the mobile multimedia processor 102 is associated with a second power domain. The first power domain and the second power domain may refer to power domains such as those described above with respect to FIGS. 2 and 3, for example. The first portion and the second portion of the mobile multimedia processor 102 may be integrated on a single substrate.

The first portion of the mobile multimedia processor 102, which comprises the VPU 103A, may be powered down upon completion of the transfer of the data to the second portion of the mobile multimedia processor 102. Data may then be transferred from the second portion of the mobile multimedia processor 102 to a device that is external to the mobile multimedia processor 102. For example, data may be transferred from the on-chip RAM 104 to the audio interface 142 and subsequently to the audio block 108. When a trigger event associated with the transfer of data to the external device occurs, the first portion of the mobile multimedia processor 102 may be powered up.

One or more signals may be generated in the second portion of the mobile multimedia processor 102 to power up the first portion of the mobile multimedia processor 102 when the trigger event occurs. The trigger event may be associated with an amount of the data that remains to be transferred to the external device. The one or more signals may be generated in the second portion of the mobile multimedia processor 102 to power up the first portion of the mobile multimedia processor 102 when the amount of data that remains to be transferred to the external device is below a threshold value.

State information associated with the first portion of the mobile multimedia processor 102 may be stored when the first portion of the mobile multimedia processor 102 is powered down. The state information may be stored in an SDRAM such as the SDRAM 140, for example. The state information may be stored in a memory that is external to the mobile multimedia processor 102. When the first portion of the mobile multimedia processor 102 is powered up, the stored state information may be received by the mobile multimedia processor 102. The first portion of the mobile multimedia processor 102 may be rebooted based on the received state information. Additional data may be transferred from the first portion of the mobile multimedia processor 102 to the second portion of the mobile multimedia processor 102 after the first portion of the mobile multimedia processor 102 is powered up.

Although various embodiments of the invention have been provided in which power management is performed in connection with the processing of audio data, these have been given by way of example and not of limitation. Similar methods and/or systems may be implemented in which power management may be performed in connection with data processing that is associated with video data or with a combination of video data and audio data, for example.

Another embodiment of the invention may provide a non-transitory machine and/or computer readable storage and/or medium, having stored thereon, a machine code and/or a computer program having at least one code section executable by a machine and/or a computer, thereby causing the machine and/or computer to perform the steps as described herein for suspending a video processor and saving the processor state in a synchronous dynamic access memory (SDRAM), utilizing a core processor.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling power, the method comprising:
   in an integrated circuit comprising a multimedia processor, said multimedia processor comprising an audio interface and a processing unit:
      decoding coded audio data with the processing unit to generate decoded audio data;
      storing the decoded audio in memory;
      powering down the processing unit; and
      providing, with the audio interface, the decoded audio data from the memory to an output, while the processing unit is powered down
      powering up the processing unit in response to an amount of decoded audio data to be transferred falling below a threshold amount of decoded audio data.

2. The method according to claim 1, further comprising storing processor states for the processing unit in memory, before powering down the processing unit.

3. The method according to claim 1, wherein the processing unit is powered down in response to a first amount of audio data being decoded.

4. The method according to claim 1, further comprising retrieving stored processor states from the memory in response to the amount of decoded audio data to be transferred falling below a threshold amount of decoded audio data.

5. The method according to claim 1, wherein the processing unit is a video processing core and power is removed from the entire video processing core during power down.

6. The method according to claim 4, further comprising decoding a burst of coded audio data in response to the amount of decoded audio data to be transferred falling below a threshold amount of decoded audio data.

7. The method according to claim 4, further comprising storing processor states for the processing unit in memory, before powering down the processing unit.

8. A method for controlling power, the method comprising:
   in an integrated circuit comprising a multimedia processor, said multimedia processor comprising an audio interface and a processing unit, wherein the processing unit includes a vector processing unit, a graphics processing unit, and a video coder:
      decoding coded audio data with the processing unit to generate decoded audio data;
      storing the decoded audio in memory;
      powering down the processing unit; and
      providing, with the audio interface, the decoded audio data from the memory to an output, while the processing unit is powered down wherein the processing unit includes a vector processing unit, a graphics processing unit, and a video coder.

9. A method for controlling power, the method comprising:
   in an integrated circuit comprising a multimedia processor, said multimedia processor comprising an audio interface and a processing unit, wherein the processing unit is a video processing core and power is removed from the entire video processing core during power down:
      decoding coded audio data with the processing unit to generate decoded audio data;
      storing the decoded audio in memory;
      powering down the processing unit; and
      providing, with the audio interface, the decoded audio data from the memory to an output, while the processing unit is powered down wherein the processing unit includes a vector processing unit, a graphics processing unit, and a video coder.

10. A system for controlling power, the system comprising:
    an integrated circuit including a multimedia processor having a plurality of power control domains, each power control domain being configured for independent power control from each other power control domain of the plurality of power domains, the plurality of power control domains comprising an interface domain configured to process audio output while each other power control domain is suspended, wherein the plurality of power control domains includes an image domain and the interface domain is configured to process the audio output while the image domain is suspended.

11. The system according to claim 10, wherein the plurality of power control domains includes a graphics domain and the interface domain is configured to process the audio output while the graphics domain is suspended.

12. A system for controlling power, the system comprising:
    an integrated circuit including a multimedia processor having a plurality of power control domains, each power control domain being configured for independent power control from each other power control domain of the plurality of power domains, the plurality of power control domains comprising an interface domain configured to process audio output while each other power control domain is suspended, wherein the plurality of power control domains includes a graphics domain and the interface domain is configured to process the audio output while the graphics domain is suspended.

13. A system for controlling power, the system comprising:
    an integrated circuit including a multimedia processor having a plurality of power control domains, each power control domain being configured for independent power control from each other power control domain of the plurality of power domains, the plurality of power control domains comprising an interface domain configured to process audio output while each other power control domain is suspended, wherein the plurality of power control domains includes an audio domain and the interface domain is configured to process the audio output while the audio domain is suspended.

14. The system according to claim 13, wherein power is removed from the audio domain while the audio domain is suspended.

15. The system according to claim 14, wherein audio domain comprises a vector processing unit, a direct memory access controller, and a display driver.

16. The system according to claim 13, wherein the audio domain includes a processing unit for decoding audio data.

17. The system according to claim 16, wherein the processing unit is configured to store processor states in memory, before suspension of the audio domain.

18. The system according to claim 17, wherein the audio domain is suspended in response to a first amount of audio data being decoded.

19. The system according to claim 18, wherein the audio domain configured to wake-up in response to an amount of decoded audio data to be transferred falling below a threshold amount of decoded audio data.

20. The system according to claim 19, wherein the processing unit is configured to retrieve processor states in response to audio domain waking-up.

* * * * *

UNITED STATES PATENT AND TRADEMARK OFFICE
CERTIFICATE OF CORRECTION

PATENT NO. : 9,317,103 B2  
APPLICATION NO. : 13/873742  
DATED : April 19, 2016  
INVENTOR(S) : Gordon Hollingworth Page 1 of 1

It is certified that error appears in the above-identified patent and that said Letters Patent is hereby corrected as shown below:

Title Page (71) "Irvince" should be --Irvine--.

Signed and Sealed this  
Fifth Day of July, 2016

Michelle K. Lee  
*Director of the United States Patent and Trademark Office*